June 7, 1932.　　　R. A. RUSSELL, JR　　　1,861,883
AUTOMOBILE HEADLIGHT
Filed July 10, 1930
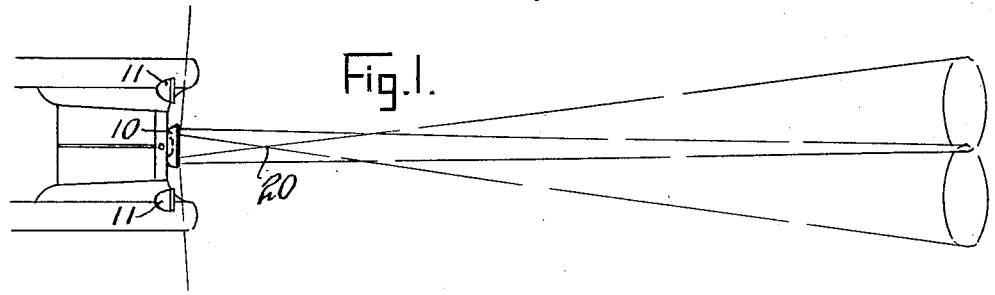
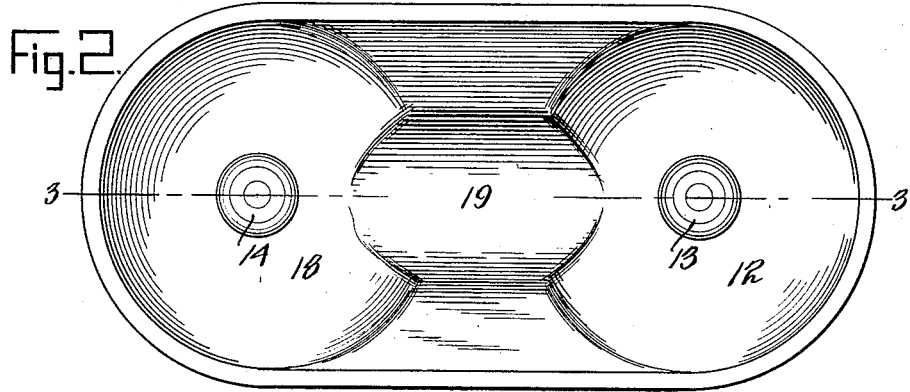
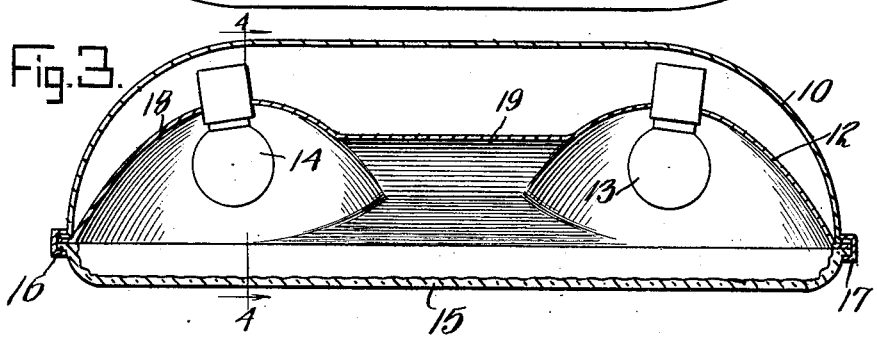
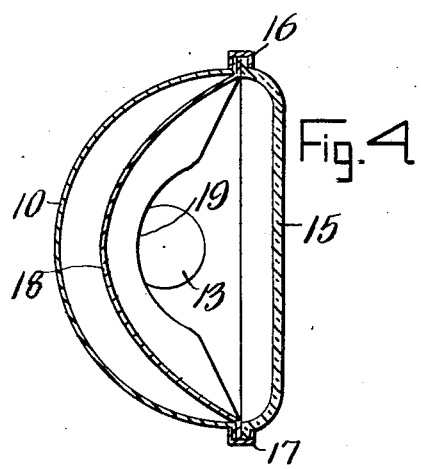
Inventor
Rufus A. Russell, Jr.
Attorney Patented June 7, 1932

1,861,883

UNITED STATES PATENT OFFICE

RUFUS A. RUSSELL, JR., OF DAYTONA BEACH, FLORIDA

AUTOMOBILE HEADLIGHT

Application filed July 10, 1930. Serial No. 467,022.

This invention relates to automobile headlights and particularly to anti-glare headlights.

An object of the invention is to provide a headlight which will effectively illuminate the roadway to a safe distance in front of a traveling vehicle without creating a blinding glare in the eyes of the driver of an approaching vehicle.

Referring to the accompanying drawing, which is made a part hereof and on which similar reference characters indicate similar parts, Figure 1 is a plan view of the device as applied to the front portion of a motor vehicle, Figure 2 is a front view of the device, Figure 3 is a section on line 3—3 of Figure 2, and Figure 4 a section on line 4—4 of Figure 3.

In the drawing numeral 10 indicates a casing in which the lights are housed, this casing being suitably secured on the front of the car, as for example between the usual headlights 11. Within the casing 10 is secured the reflector 12 carrying light bulbs 13 and 14. The necessary wiring of the bulbs is not shown since the conventional wiring may be used. The reflector 12 is held within the casing by means of the lens 15 which is secured to the flanged rim 16 of the casing 10 by means of a ring 17. The lens 15 may be made with the usual prismatic corrugations in order to diffuse the light from the lamps secured in the reflector. The ends of the reflector 12 are provided with concaved hemispherical portions 18. These are joined by a dished or trough portion 19 which is relatively elongated and has light reflecting sides so as to direct a beam of light into a relatively thin strip of light towards the front of the vehicle. The hemispherical portions 18 are placed so that their axes are not quite parallel but converge and meet at a point in advance of the front of the car. The point of convergence is shown in Figure 1 at 20. The trough portion 19 is more fully described and claimed in my prior Patents 1,595,025, granted August 3, 1926; 1,618,108 granted February 15, 1927, and 1,681,909 granted August 21, 1928.

My improved headlight is preferably placed intermediate the ordinary headlights on an automobile and serves as an auxiliary light which may be used to light the roadway in front of the car when approaching another car, but which will produce a diffused band of light which converges at a point sufficiently low down that it will not interfere with the drivers of approaching cars. The central portion 19 of the reflector reflects the light from both of the bulbs to focus this light into a relatively thin band of light which is not high enough to be thrown into the eyes of the driver of an approaching vehicle. By having the reflectors 18 converge a band of light is thrown toward the front of the car which fully illuminates the roadway but which does not produce a glare to blind an approaching driver. The prismatic lens 15 serves further to diffuse the light so as further to remove the glare from the lamps.

While my improved headlight has been particularly described with relation to its use on automobiles, it is to be understood as in no sense limited to this purpose, but may be used for whatever it may be adaptable.

Obviously it may be used on motorcycles and other vehicles and even on electric street railway cars.

It will be obvious to those skilled in the art that various changes may be made in my device without departing from the spirit of the invention and therefore I do not limit myself to what is shown in the drawing and described in the specification, but only as indicated in the appended claim.

Having thus fully described my said invention, what I claim as new and desire to secure by Letters Patent, is:

A vehicle light comprising a transversely elongated casing having a reflector mounted therein, said reflector comprising a pair of hemi-spherical portions joined by a trough, said trough being concaved at the center and continuous from both sides of the concaved center into surfaces to the top and bottom edges of said hemi-spherical portions adapted to direct light in a narrow strip in front of the vehicle, light bulbs mounted in said hemi-spherical reflector portions, said reflector portions being positioned with their axes to lie in lines converging to a point in advance of the vehicle and a prismatic lens mounted on the front side of said casing, substantially as set forth.

In witness whereof, I have hereunto set my hand at Cincinnati, Ohio, this 7th day of July, A. D. nineteen hundred and thirty.

RUFUS A. RUSSELL, Jr.